US005115232A

United States Patent [19]

Iizuka

[11] Patent Number: 5,115,232

[45] Date of Patent: May 19, 1992

[54] DISPLAY DEVICE DRIVING CIRCUIT

[75] Inventor: Taiji Iizuka, Nara, Japan

[73] Assignee: Sharp Kabushiki Kaisha, Osaka, Japan

[21] Appl. No.: 509,014

[22] Filed: Apr. 13, 1990

[30] Foreign Application Priority Data

Apr. 15, 1989 [JP] Japan .................................... 1-95957

[51] Int. Cl.[5] .......................... G09G 3/36; H04N 5/04

[52] U.S. Cl. .................................... 340/784; 340/805; 340/811; 358/148

[58] Field of Search ............... 358/230, 236, 241, 148; 340/784, 805, 811, 765, 793

[56] References Cited

U.S. PATENT DOCUMENTS

| | | | |
|---|---|---|---|
| 4,393,379 | 7/1983 | Berting et al. | 340/784 |
| 4,393,380 | 7/1983 | Hosokawa et al. | 340/805 |
| 4,427,978 | 1/1984 | Williams | 340/793 |
| 4,525,710 | 6/1985 | Hoshi et al. | 340/765 |
| 4,556,880 | 12/1985 | Hamada | 340/784 |
| 4,775,891 | 10/1988 | Aoki et al. | 340/784 |

FOREIGN PATENT DOCUMENTS 0173158 12/1985 European Pat. Off. .

*Primary Examiner*—Alvin E. Oberley
*Assistant Examiner*—Amare Mengistu
*Attorney, Agent, or Firm*—David G. Conlin; Robert F. O'Connell

[57] ABSTRACT

A display device driving circuit for converting a binary display data into an AC signal having no DC component and supplying the AC signal to a display device including, a synchronizing circuit for receiving the display data, a binary modulating signal and a clock signal and for synchronizing the display data and the modulating signal with the clock signal, a decoder connected to the synchronizing circuit for generating a signal having a logic level corresponding to logic levels of the synchronized display data and modulating signal, and a power supply circuit connected to the decoder for outputting a voltage having an amplitude corresponding to the logic level of the signal received from the decoder to the display device.

6 Claims, 5 Drawing Sheets

DISPLAY DEVICE DRIVING CIRCUIT

BACKGROUND OF THE INVENTION

1. Field of the Invention

This invention relates to a driving circuit used for a display device such as a liquid crystal display device.

2. Description of the Related Art

In a liquid crystal display device having crystal cells arranged so as to form a matrix, it is prohibited to apply a voltage having a DC component to a crystal cell in order to prevent the crystal cell from being deteriorated. Therefore, a binary voltage signal received as a display data having a DC component is converted into an AC signal having no DC component by a binary modulating signal having a predetermined period.

Converting the display data into the AC signal is realized by generating a voltage according to logic levels of the display data and the modulating signal.

As long as the display data synchronizes with the modulating signal, there is no problem. However, when a certain phase difference occurs between the display data and the modulating signal, that is, when the display data is asynchronous with the modulating signal, there arises such a problem that a noise appears on an image displayed on a display device as described in detail later.

SUMMARY OF THE INVENTION

It is an object of the present invention to provide a circuit for driving a display device which makes it possible for the display device to display noiseless images, even though the display data is asynchronous with the modulating signal.

The object of the present invention can be achieved by a display device driving circuit for converting a binary display data into an AC signal having no DC component and supplying said AC signal to a display device comprising synchronizing means for receiving said display data, a binary modulating signal and a clock signal and for synchronizing said display data and said modulating signal with said clock signal, decoder means connected to said synchronizing means for generating a signal having a logic level corresponding to logic levels of said synchronized display data and modulating signal, and power supply means connected to said decoder means for outputting a voltage having an amplitude corresponding to said logic level of said signal received from said decoder means to said display device.

According to the above-described driving circuit, since the display data and the modulating signal are precisely synchronized before they are added together, a noise is prevented from being generated, thereby obtaining a clear image, even if they are asynchronous with each other.

Further objects and advantages of the present invention will be apparent from the following description, reference being had to the accompanying drawings wherein preferred embodiment of the present invention is clearly shown.

DESCRIPTION OF THE PREFERRED EMBODIMENT

First, it will be explained below how noise appears in a drive signal to be supplied to a segment electrode of a liquid crystal panel when the display data and the modulating signal are asynchronous with each other referring to FIGS. 1 to 3.

Figure 1:
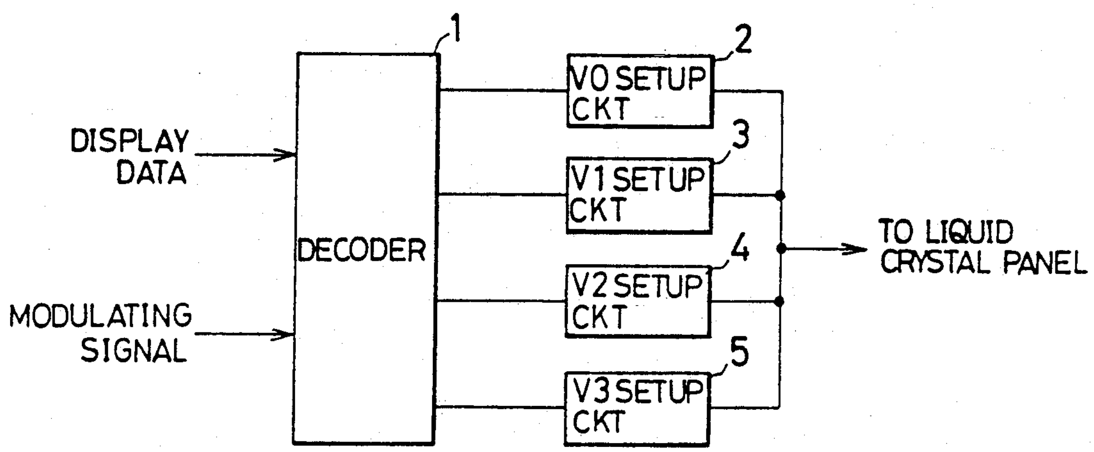
FIG. 1 is a block diagram showing a segment driving circuit for a liquid crystal display panel which has not synchronizing means.
Figure 2:
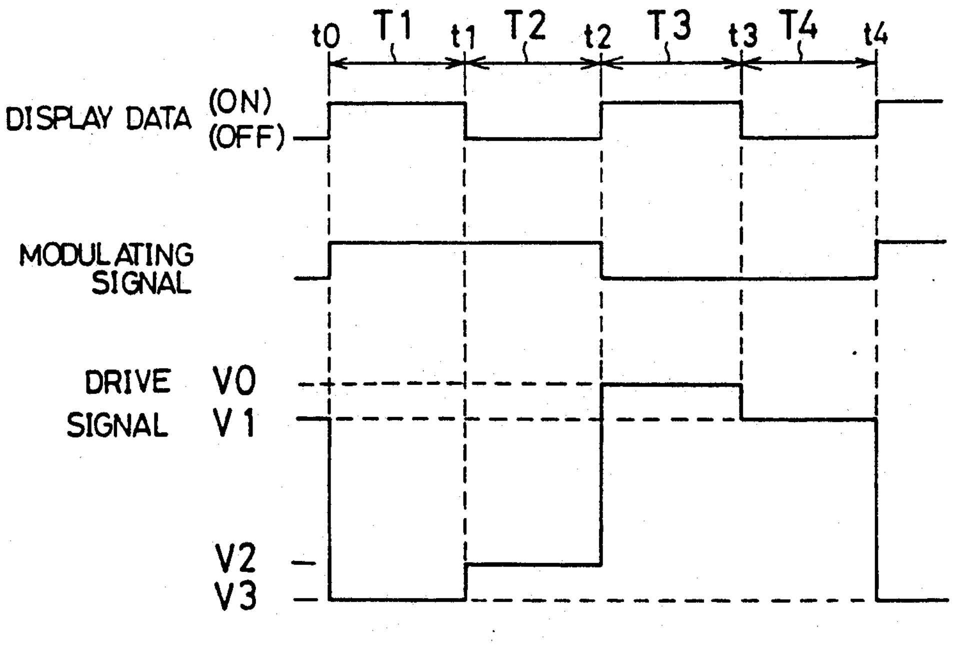
FIG. 2 is a timetable illustrating waveforms of a display data and a modulating signal which are synchronized with each other and applied to the driving circuit of FIG. 1 and a waveform of a drive signal derived from the driving circuit of FIG. 1 when these display data and modulating signal are applied thereto.

In a segment driving circuit of FIG. 1, the display data and the modulating signal shown in FIG. 2 are supplied to a decoder 1. The decoder 1 selects, according to the display data and the modulating signal inputted thereto, one of voltage setup circuits 2 to 5 which set up the first to fourth level (V0 to V3) respectively, whereby, a drive signal shown in FIG. 2 are derived and applied to the segment electrode of the liquid crystal panel.

For example, as shown in FIG. 2, during a first period T1 from time t0 to time t1 and a second period T2 from time t1 to t2, the display data is set at H level indicative of "on state" and at L level indicative of "off state" respectively. Also, during a third period T3 from time t2 to time t3 and a fourth period T4 from time t3 to t4, the display data is set at the same H and L levels respectively as the first and second periods.

The modulation signal is set at the H level during the first and second periods T1, T2, while it is set at the L level during the third and fourth periods T3, T4.

The display data which has been set at the H level during the periods T1 and T3, and at the L level during the periods T2 and T4, is converted to a drive signal which is at the fourth level V3 during the period T1, at the third level V2 during the period T2, at the first level V0 during the period T3, and at the second level V1 during the period T4 by using the modulating signal.

The display data thus converted into the drive signal is supplied to the segment electrode and at the same time, other drive signal corresponding to the display data is supplied to a common electrode.

Figure 3:
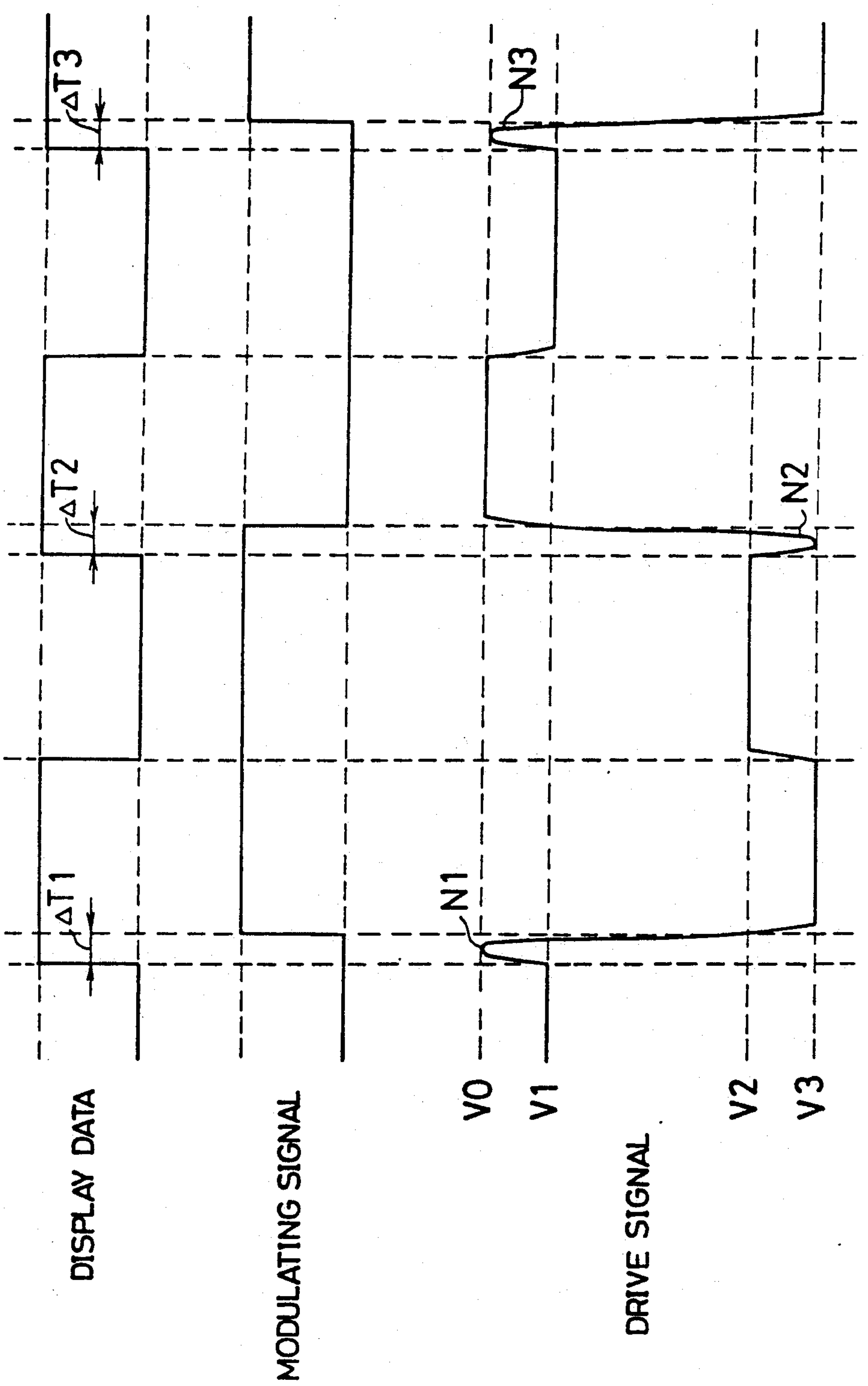
FIG. 3 is a timetable showing waveforms of a display data and a modulating signal which are asynchronous with each other and a waveform of a drive signal derived from the driving circuit of FIG. 1 when these asynchronous display data and the modulating signal are applied thereto.

Under the above condition, if the timings of the rising and falling edges of the display data and those of the modulating signal are shifted from each other as shown in FIG. 3, undesired voltage levels arise during periods ΔT1, ΔT2, ΔT3, and noises N1, N2 and N3 appear in the drive signal.

An embodiment of the driving circuit according to this invention will now be described.

Figure 4:
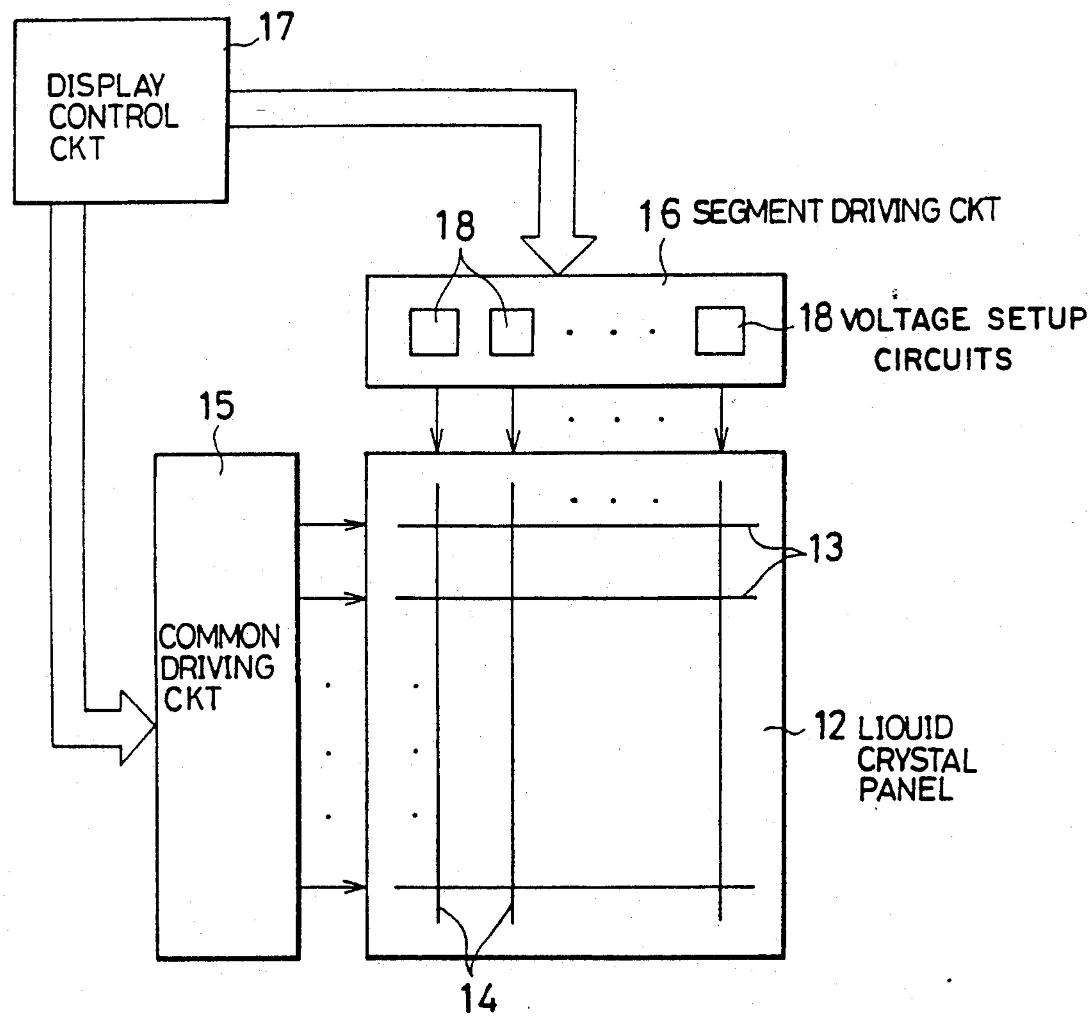
FIG. 4 is a block diagram illustrating a liquid crystal display device having a driving circuit 16 according to this invention.

FIG. 4 is a block diagram of a liquid crystal display device provided with a segment driving circuit 16 according to this invention.

As shown in FIG. 4, a plurality of common electrodes 13 and segment electrodes 14 are disposed on a liquid crystal panel 12 so as to intersect with each other. Each common electrode 13 and segment electrode 14 are supplied with drive signals respectively derived from a common driving circuit 15 and a segment driving circuit 16, whereby an image is displayed on the liquid crystal panel 12. Display control information including the display data, the modulating signal, a clock signal, and the like, is supplied to the driving circuits 15, 16 through a display control circuit 17. The segment driving circuit 16 is provided with voltage setup circuits 18 each corresponding to each segment electrode 14. 27. The display data, the modulating signal and the clock signal are supplied from the display control circuit 17.

Figure 6:
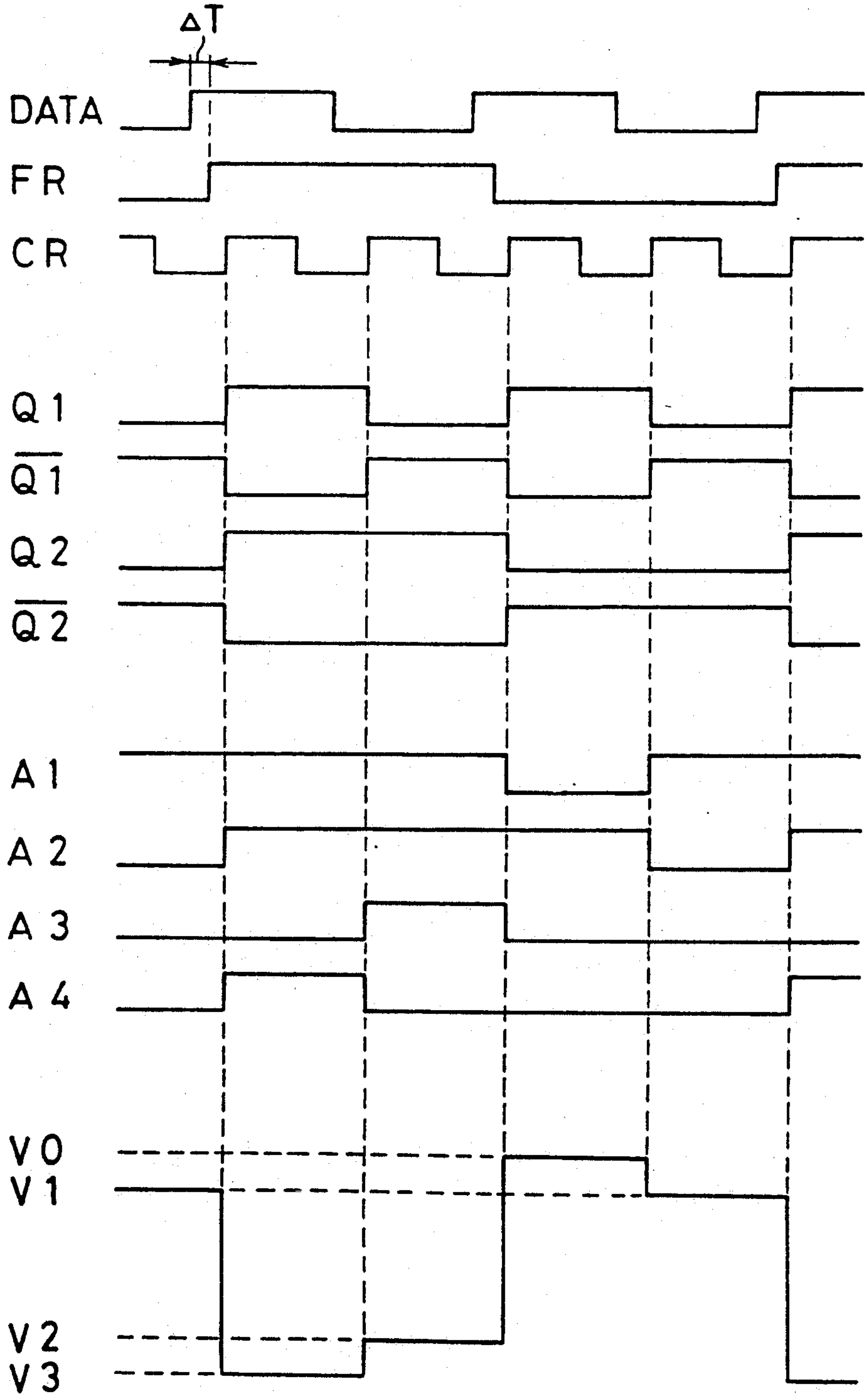
FIG. 6 is a timetable showing waveforms of voltages at various sections of the voltage setup circuit 18 of FIG. 5.

When the display data DATA, the modulating signal FR and the clock signal CR shown in FIG. 6 are applied to the data inputs D and the clock inputs CK of the flip-flops 26, 27, signals having waveforms shown in FIG. 6 appears at the outputs Q1, $\overline{Q1}$, Q2, and $\overline{Q2}$ As seen from FIG. 6, even if the display data and the modulating signal are asynchronous with each other, these data and signal are made synchronous by means of the common clock signal, whereby the gap $\Delta T$ of timing between the display data and the modulating signal can be eliminated.

Therefore, signals having the waveforms shown in FIG. 6 are obtained at the outputs of the gates A1 to A4 of the decoder 25. Whereby a drive signal having the waveform shown in FIG. 6 is delivered to the node 28 of the drive power supply circuit 24 and then to the corresponding segment electrode.

By the provision of the flip-flops 26, 27 before the decoder 25, the display data and the modulating signal asynchronously inputted are synchronized with the clock signal, whereby the drive signal can be uniquely determined regardless of the phase differences between the display data and the modulating signal.

Figure 5:
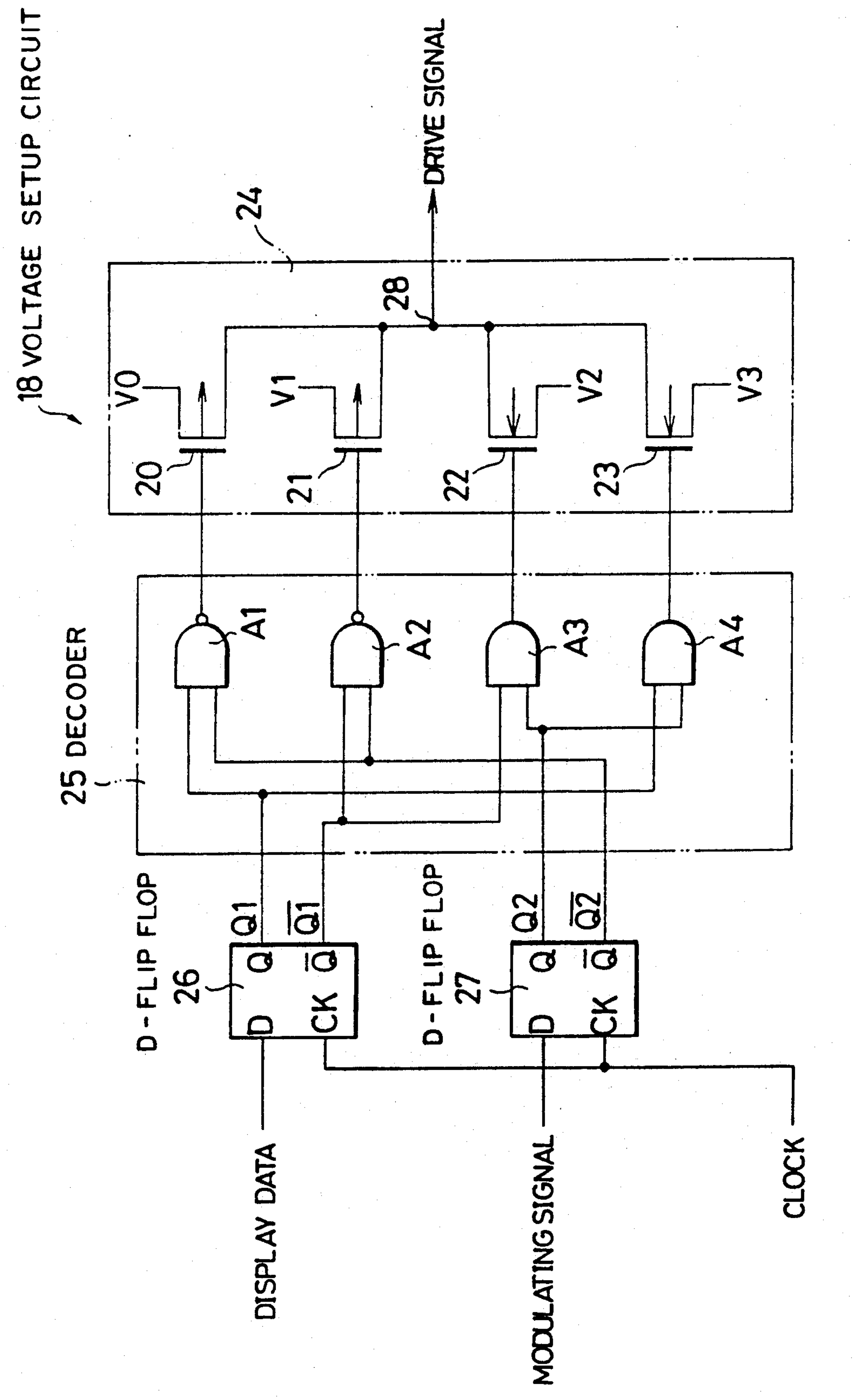
FIG. 5 is a block diagram of a voltage setup circuit 18 of the driving circuit 16 of FIG. 4.

As shown in FIG. 5, the voltage setup circuit 18 comprises a drive power supply circuit 24 including P. channel field-effect transistors 20, 21 (hereinafter referred to as FET) and N-channel FETs 22, 23, a decoder 25 and two D-type flip-flops 26, 27. The FETs 20 to 23 receive voltages of levels V0, V1, V2, and V3 at their sources respectively. While each drain of these FETs is connected to a node 28 which is connected to a corresponding segment electrode.

The decoder 25 includes NAND gates A1, A2 and AND gates A3, A4.

One output Q1 of the flip-flop 26 is connected to each one input of the NAND gate A1 and the AND gate A4. The other output $\overline{Q1}$ of the flip-flop 26 is connected to each one input of the NAND gate A2 and the AND gate A3. One output Q2 of the flip-flop 27 is connected to each other input of the AND gate A3 and the AND gate A4. The other output $\overline{Q2}$ of the flip-flop 27 is connected to each other input of the NAND gate A1 and the NAND gate A2. A display data for turning the segment electrode on and off is applied to the data input D of the flip-flop 26, while a modulating signal for converting the display data into an AC signal having no DC component is applied to the data input D of the flip-flop 27. The same clock signal is applied to each clock inputs CK of the flip-flops 26, The above described means for synchronization can be applied to the common driving circuit 15 though it has been described as applied to the segment driving circuit 16. As for the types of the liquid crystal display device, a so-called simple matrix type liquid crystal display device or an active matrix type liquid crystal display device can be used.

Many widely different embodiments of the present invention may be constructed without departing from the spirit and scope of the present invention. It should be understood that the present invention is not limited to the specific embodiment described in this specification, except as defined in the appended claims.

What is claimed is:

1. A display device driving circuit for converting a binary display data into an AC signal having no DC component and supplying said AC signal to a display device comprising:

synchronizing means for receiving said display data, a binary modulating signal and a clock signal and for synchronizing said display data and said modulating signal with said clock signal;

decoder means connected to said synchronizing means for generating a signal having a logic level corresponding to logic levels of said synchronized display data and modulating signal; and power supply means connected to said decoder means for outputting a voltage having an amplitude corresponding to said logic level of said signal received from said decoder means to said display device;

wherein said synchronizing means comprise a first D-type flip-flop which receives said display data at one input thereof and said clock signal at the other input thereof, and a second D-type flip-flop which receives said modulating signal at one input thereof and said clock signal at the other input thereof.

2. A circuit according to claim 1, wherein said decoder means comprise a first and a second NAND gates and a first and a second AND gates, one output of said first D-type flip-flop being connected to one input of said first NAND gate and to one input of said second AND gate, the other output of said first D-type flip-flop being connected to one input of said second NAND gate and to one input of said first AND gate, one output of said second D-type flip-flop being connected to the other input of said first AND gate and to the other input of said second AND gate, the other output of said second D. type flip-flop being connected to the other input of said first NAND gate and to the other input of said second NAND gate.

3. A circuit according to claim 2, wherein said power supply means comprise first and second FETs of P-channel type, and third and fourth FETs of N-channel type, an output of said first NAND gate being connected to a gate of the first FET, an output of said second NAND gate being connected to a gate of the second FET, an output of said first AND gate being connected to a gate of the third FET, an output of said second AND gate being connected to a gate of the fourth FET, a voltage of first level being applied to a source of the first FET, a voltage of second level being applied to a source of the second FET, a voltage of third level being applied to a source of the third FET, a voltage of fourth level being applied to a source of the fourth FET, drains of these FETs being connected to a common node.

4. A circuit according to claim 1, wherein said display device is a matrix type liquid crystal display device.

5. A circuit according to claim 4, wherein an output of said power supply means is connected to a segment electrode of said matrix type liquid crystal display device.

6. A circuit according to claim 45, wherein an output of said power supply means is connected to a common electrode of said matrix type liquid crystal display device.

* * * * *